Figure 1:
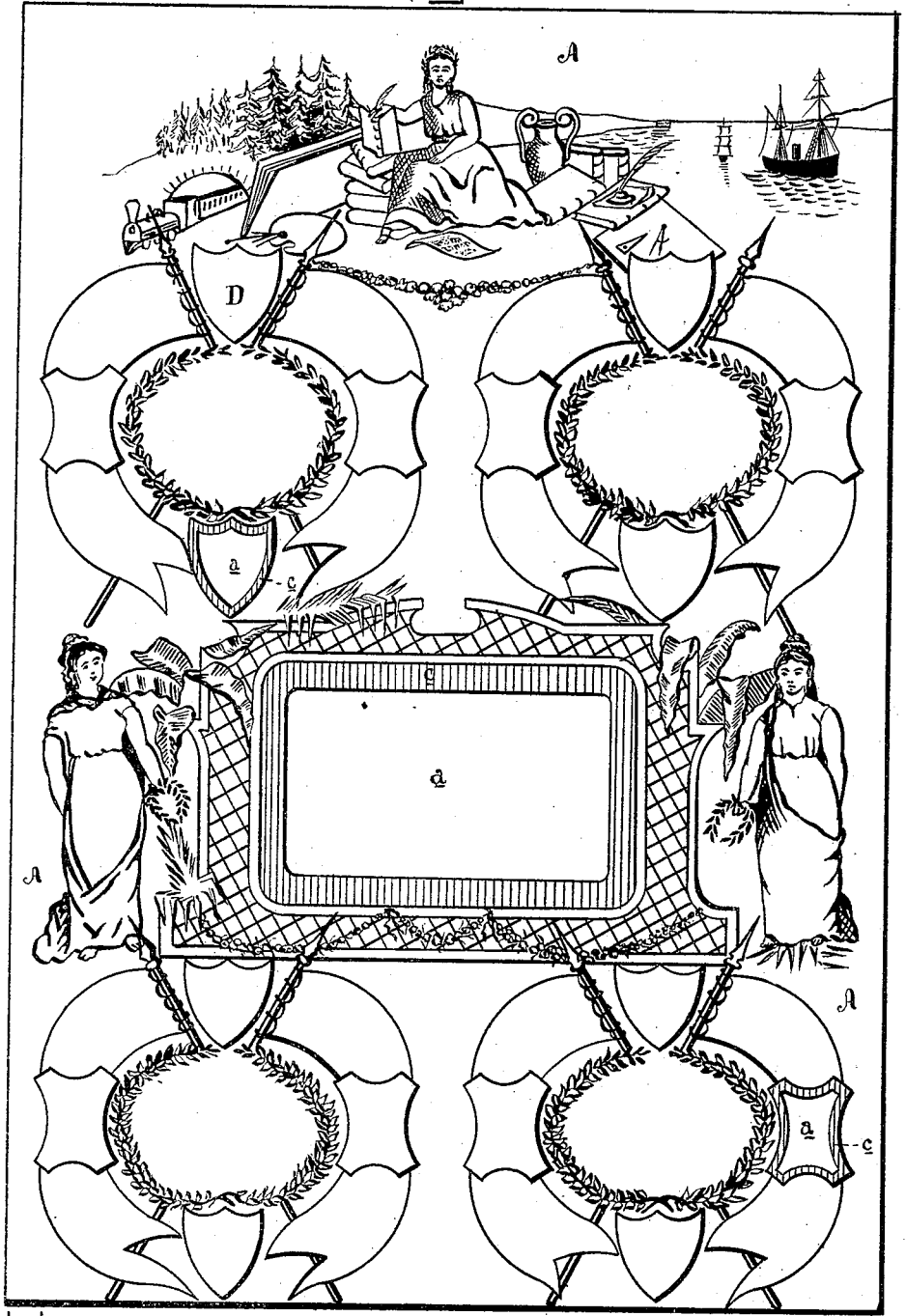

(No Model.) 2 Sheets—Sheet 1.

A. W. McARTHUR.
FRAME FOR DIPLOMAS AND CREDIT CARDS.

No. 291,921. Patented Jan. 15, 1884.

Witnesses.
L. Peterson
Jos. Beesley

Inventor.
Alex. W. McArthur
By his atty W. H. Smyth (No Model.) 2 Sheets—Sheet 2.
A. W. McARTHUR.
FRAME FOR DIPLOMAS AND CREDIT CARDS.
No. 291,921. Patented Jan. 15, 1884.
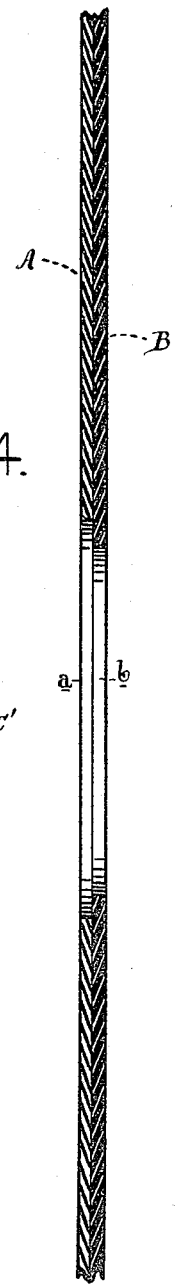
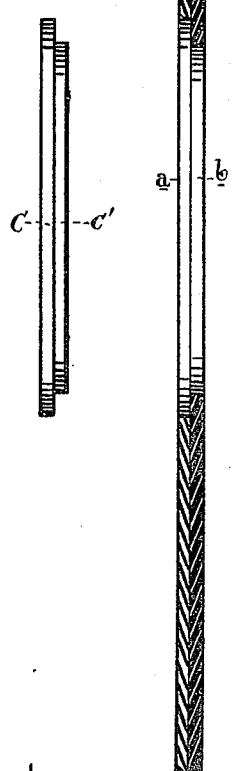
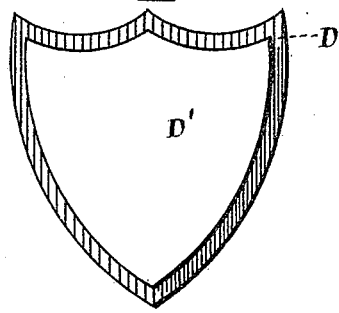
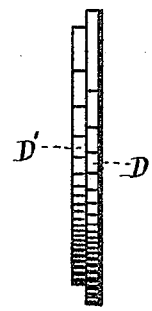
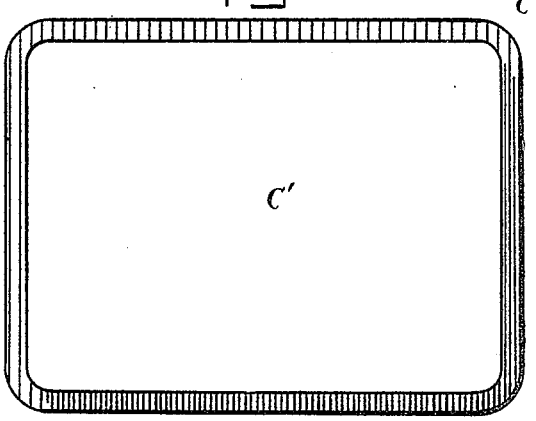
Witnesses.
L. Peterson
Jos Pecsey
Inventor.
Alex. W. McArthur
By his atty W. H. Smyth

UNITED STATES PATENT OFFICE.

ALEXANDER W. McARTHUR, OF ARROYO GRANDE, CALIFORNIA.

FRAME FOR DIPLOMAS AND CREDIT-CARDS.

SPECIFICATION forming part of Letters Patent No. 291,921, dated January 15, 1884.

Application filed March 6, 1883. Renewed November 7, 1883. (No model.)

*To all whom it may concern:*

Be it known that I, ALEXANDER W. MC-ARTHUR, of Arroyo Grande, county of San Luis Obispo, State of California, have invented an Improvement in Frames; and I hereby declare the following to be a full, clear, and exact description thereof.

My invention relates to a new and useful frame or mount specially designed for the insertion thereof of credit-cards, yearly diplomas, final diplomas, &c., and which I term a "diploma-album."

My invention consists in two sheets of paper, card-board, or other suitable material, the backs of which are caused to adhere, each sheet having perforations corresponding in shape and position, though not in size, whereby the rim surrounding the smaller one may be exposed through the larger one. The credit-cards, diplomas, &c., are each cut and fashioned to correspond to these perforations, one being inserted in the larger perforation on one side, and caused to adhere to the exposed rim of the back of the smaller perforation, while another is inserted in the smaller perforation on the other side, and is made to adhere to the back of the first diploma, card, &c.

The object of my invention is to provide a frame or mount adapted to receive and hold a number of cards, diplomas, &c., which together may form a series indicating the results attained.

Referring to the accompanying drawings, Figure 1, Sheet 1, is a front elevation of my frame or mount, showing the larger perforation of one sheet with the rims surrounding those of the smaller perforations of the other sheet. Fig. 2, Sheet 2, is a vertical section, showing the two sheets having the different-sized perforations. Fig. 3 shows two diplomas of different sizes adhering, and the overlapping edges of the larger being designed to adhere to the exposed rim of the smaller perforation, in which the smaller diploma is to fit. Fig. 4 shows an edge view of the same. Figs. 5 and 6 show views similar to Figs. 3 and 4, applied to credit-cards.

Let A represent a sheet of paper, card-board, or other suitable material suitably ornamented, and to the back of which, as shown in Fig. 2, a sheet, B, of equal size, is caused to adhere.

In the sheet A are a number of perforations, $a\ a$, of suitable size and shape, and in the sheet B are made similar ones, $b\ b$, though smaller, so that, as shown in Figs. 1 and 2, the rim $c\ c$, surrounding the perforations in sheet B, are exposed through those in sheet A.

In Fig. 3 I show two diplomas or cards, C C', one larger than the other. One is designed to exactly fill a perforation, $a$, in sheet A, and to adhere to the rim $c$, and the other is designed to fill a perforation, $b$, in sheet B, and to adhere to the back of the other diploma, when the two will be seen on edge, as shown in Fig. 4.

In Figs. 5 and 6 I have designated some small cards by the letters D D'. These cards are fitted to the frame in the same manner as the larger ones, C C'.

In Fig. 1 I show a number of cards, diplomas, &c., in place, though I have left several open to show rim $c$.

This frame or mount is very convenient for preserving cards, certificates, diplomas, &c., and is of advantage in schools, colleges, &c. The obverse and reverse sides are decorated with an artistic and fanciful design, and the cards, certificates, and diplomas are similarly decorated, so as to form a part of the general design, that when all the cards, certificates, and diplomas, are in their respective places, the ornamental design may be complete, and the surface be unbroken and continuous.

Having thus described my invention, what I claim as new, and desire to secure by Letters Patent, is—

In a frame or mount, a sheet of paper or other suitable material, having perforations, and a second sheet adhering to the back of the first, said second sheet having perforations smaller than the first, so that a portion or rim of said second sheet shows through the larger perforations, in combination with a slip of paper or other suitable material of the size and shape of the larger perforation and adhering to the exposed rim of the second sheet, and a second slip of paper the size and shape of the smaller perforation and adhering to the back of the larger slip, substantially as and for the purpose herein described.

ALEX. W. McARTHUR.

Witnesses:
ARZA PORTER,
JOHN HAMLIN.